United States Patent [19]

Felt et al.

[11] Patent Number: 4,876,891
[45] Date of Patent: Oct. 31, 1989

[54] PRODUCT-DISPENSING METHOD AND APPARATUS

[75] Inventors: George R. Felt, Brown Deer; Donna K. Multhauf, Grafton; Sudhakar S. Wagle, Mequon, all of Wis.

[73] Assignee: Rorer Pharmaceutical Corporation, Fort Washington, Pa.

[21] Appl. No.: 203,566

[22] Filed: May 25, 1988

Related U.S. Application Data

[63] Continuation of Ser. No. 840,876, Mar. 18, 1986, abandoned.

[51] Int. Cl.$^4$ .......................... G01F 19/00; G01G 5/02
[52] U.S. Cl. ......................................... 73/426; 177/207; 222/23; 222/154; 222/158
[58] Field of Search .............. 73/296, 319, 322, 322.5, 73/426–428, 444, 450; 116/228; 177/207; 215/11 R, 365; 222/23, 49, 50, 51, 77, 154, 155, 157, 158

[56] References Cited

U.S. PATENT DOCUMENTS

| | | | |
|---|---|---|---|
| 607,010 | 7/1898 | Baumann | 177/207 |
| 2,132,015 | 10/1938 | Collins | 73/450 |
| 2,507,684 | 5/1950 | Smith | 73/428 |
| 3,368,591 | 2/1968 | Zerbetto | 222/158 |
| 3,505,870 | 4/1970 | Smylie | 222/158 |
| 3,687,209 | 8/1972 | Goldberg et al. | 222/77 |
| 4,630,481 | 12/1986 | Bergstrom et al. | 73/450 |

FOREIGN PATENT DOCUMENTS

| | | | |
|---|---|---|---|
| 1318955 | 1/1963 | France | 73/427 |
| 2485760 | 12/1981 | France | 215/365 |
| 544431 | 6/1956 | Italy | 177/207 |

OTHER PUBLICATIONS

Meynieu Leonard, #17–1366, Oct. 26, 1886.

Primary Examiner—William A. Cuchlinski, Jr.
Assistant Examiner—W. Morris Worth

[57] ABSTRACT

An aerosol spray dispenser of flowable pharmaceutical product is provided with a flotation stabilizing arrangement such that it will float in water in a stabilized erect position even when empty of product; a scale is associated with the dispenser so that the depth at which it floats can be read by comparing the position of the surface of the water in which it floats with graduations on the scale. The stabilizing action may be obtained by placing the dispenser in a floatable bottom-weighted vial, with the scale located in the exterior of the vial, and the combination of vial and dispenser then floated in water. In other embodiments the vial need not be used, in which case the dispenser itself may be bottom-weighted to assure its stabilized erect flotation and the scale placed on the exterior of the dispenser; or, a cap may be provided for the dispenser which is positioned on the dispenser while both are floated in the water, the cap being top-weighted so that the assembly floats stably upside-down. In the latter case the graduations may be placed on the dispenser, or on a strip integral with the cap extending along the outside of the dispenser; alternatively, the cap may be provided with an integral skirt which extends completely around the dispenser and to its bottom end, with the scale located on the exterior of the skirt.

1 Claim, 1 Drawing Sheet

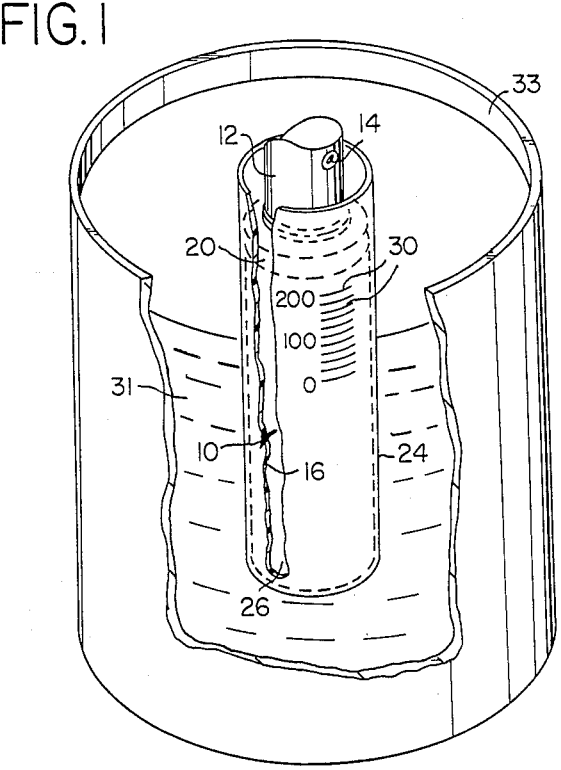
FIG. 1
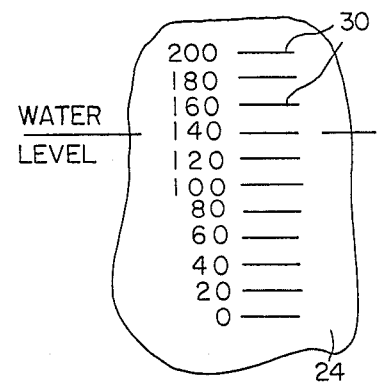
FIG. 1A
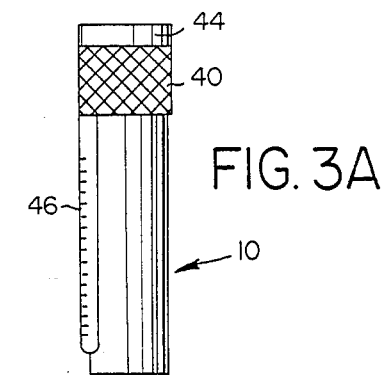
FIG. 3A
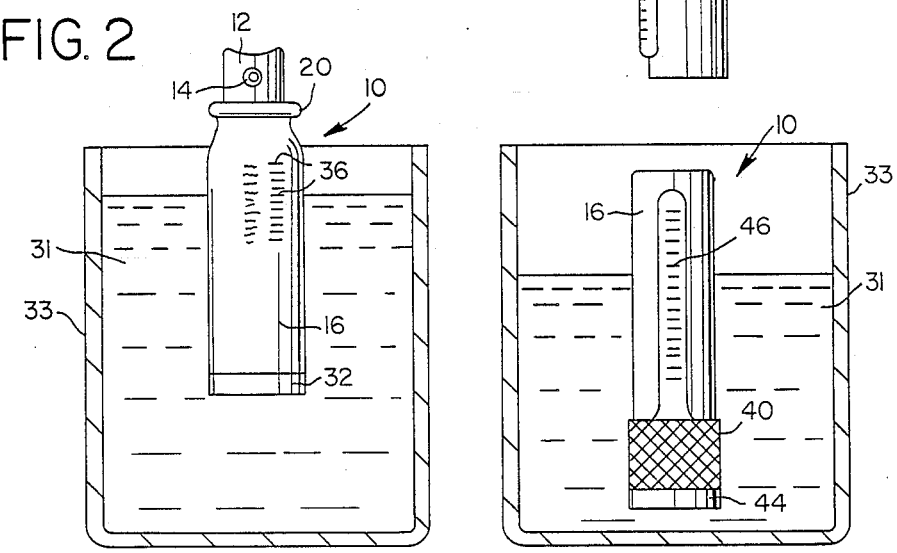
FIG. 2
FIG. 3

PRODUCT-DISPENSING METHOD AND APPARATUS

This is a continuation of co-pending application Ser. No. 840,876 filed on Mar. 18, 1986 and now abandoned.

FIELD OF THE INVENTION

This invention relates broadly to methods and apparatus for dispensing flowable products, and particularly to such methods and apparatus in which the product is dispensed from a container as a spray and the opacity of the container prevents ready observation of the quantity of the product remaining in the container at any given time. The invention is particularly applicable to aerosol dispensers of pharmaceuticals such as nitroglycerin, with respect to which it is particularly important that the user be able to determine easily at any time how much of the pharmaceutical remains in the container.

BACKGROUND OF THE INVENTION

There are a variety of applications in which it is important for a user to be able to determine readily the amount of a product which remains in a dispensing container. As an example, with respect to which the invention will be specifically described hereinafter, it is known to package nitroglycerin in a metering aerosol-type dispenser so that when a dose is to be administered it can be sprayed directly into the mouth of the user. Typically the spray device is arranged so that a full single dose is administered by one depression of an axially reciprocable button at the top of the container. Such pharmaceutical material is indicated for use in many cases of angina.

Since the container of the nitroglycerin is generally of high opacity, either due to the optical nature of its walls or to the application of opaque labels to the walls, the user cannot at all times see how much of the nitroglycerin remains in the container. This can be highly disadvantageous, particularly if the user is planning to be away from other sources of supply of nitroglycerin for a substantial period of time, and cannot tell how much of the nitroglycerin remains in his dispenser. In such event it is possible that he will run out of nitroglycerin when he needs it badly, and when an alternate source is not readily available to him.

One method by which an approximation of the amount of flowable material remaining in the dispenser can be obtained is to place the container in water, for example in a bowl or sink of water. In one example of such use, a full canister containing approximately 200 doses will sink in the water; if the canister is ¾ full, it will float with approximately a ¼ of its volume protruding above the top of the water, and if about half full it will float with more of its volume above the water surface. When it becomes depleted to the extent that it is only about ¼ full, or when it is empty, it tends to float at a variably oblique angle about half out of the water.

Such a method of indication of the quantity of product remaining in the container is obviously quite inaccurate. For example, typically it may be difficult to tell whether the canister is empty or has up to as much as 50 doses in it.

Knowledge of the quantity of product remaining in an aerosol dispenser, or in other types of dispensers, is obviously desirable in many other applications, whether in connection with pharmaceuticals or entirely different types of products.

Accordingly, it is an object of the invention to provide a new and useful method and apparatus for storing and dispensing flowable product from a container, and for indicating the quantity of such product which remains in the container at any given time.

Another object is to provide such method and apparatus in which the indications of remaining product quantity are sufficiently accurate for practical purposes.

A further object is to provide such method and apparatus which are very easy to use, and inexpensive to provide.

SUMMARY OF THE INVENTION

These and other objects of the invention are attained by the provision of product-dispensing apparatus which comprises a product-dispensing container for storing and dispensing a flowable product and which is floatable in water when filled with a quantity of product within a predetermined range. Associated with the container are flotation stabilizing means for stabilizing the angular orientation of the container when it is floating in water; also provided are scale means associated with the container, for indicating the position of the surface of the water with respect to the scale means while the container is floating on the water and when the amount of the product which it contains is within the above-mentioned predetermined range.

The more product the container has within it, the deeper it sinks into the water. Since the depth of submersion is a direct indication of the weight of the entire assembly of container and stabilizing means, and since the only variable factor is the amount of product within the container, the position of the surface of the water as read from the scale means is a direct indication of the quantity of product in the container; the scale may be marked to indicate directly the remaining number of doses, for example, in the case of a pharmaceutical product such as nitroglycerin.

In the preferred embodiment the flotation stabilizing means comprises a vial, such as an opened-top cylinder appropriately weighted at or toward its lower end so that it will float in a stable vertical position when the container is placed within it. The scale means is preferably provided in the form of graduations on the exterior of the vial, and one need then only read the position of the surface of the water on the scale means to obtain an indication of the quantity of product remaining in the container.

In another embodiment of the invention the flotation stabilizing means may be in the form of a weighting device secured to the bottom of the container, and the container and weighting device may be floated directly in the water, without using the vial. The quantity of product in the container is then determined by observing the position of the surface of the water with respect to a scale on the container itself.

In still another embodiment a removable cap, such as is commonly used with aerosol dispensers, may be employed which is weighted heavily at its upper end so that when the container with cap is placed in water, the combination floats with the cap facing downwardly, in a stabilized vertical position; in this case the scale means may be applied to an integral axial extension of the cap extending along a side surface of the container itself.

In both of the latter cases, as well as in the preferred embodiment previously described, the weighting device may be integral with the object to which it is secured; that is, in the case of the weighted vial the lower end of the vial may be solid and thick walled, and the material may be impregnated with special high-density material, to obtain the desired preferential weighting of the bottom of the vial. Similar arrangements for accomplishing integral weighting of the bottom of the container or the top of the cap may be employed if desired.

In this manner there is provided a particularly simple, inexpensive and accurate method and apparatus for providing indications of the amount of product remaining in a dispensing container.

BRIEF DESCRIPTION OF THE FIGURES

These and other objects and features of the invention will be more readily understood from a consideration of the following detailed description, taken in connection with the accompanying drawings, in which:

FIG. 1 is a perspective view, with parts broken away, of the preferred embodiment of the invention;

FIG. 1A is an enlarged fragmentary side view of a portion of the side used in the embodiment of FIG. 1;

FIG. 2 is a vertical sectional view of an alternate embodiment of the invention, with parts shown in full;

FIG. 3 is a similar view of still a third embodiment of the invention; and

FIG. 3A is a side view of the inventive device of FIG. 3 shown in a position rotated by 90° about the vertical axis from its position in FIG. 3, and inverted.

DETAILED DESCRIPTION OF SPECIFIC EMBODIMENTS

Referring now to the preferred embodiment of the invention illustrated in FIGS. 1 and 1A, there is shown a standard commercial metered-dose aerosol dispenser 10 such as is used for spray-dispensing of nitroglycerin into the oral cavity. Dispensing is accomplished by pressing downwardly the top button 12, to cause a spray of aerosol gas and fluid product to be emitted from spray opening 14. It will be assumed in this example that the product is nitroglycerin suitable for oral administration in spray form for the relief of angina.

The container 10 conventionally has a main storage portion 16 which comprise a hollow cylindrical body of a rigid material impervious to gas flow, such as plastic coated aluminum, having a closed bottom and a top which is closed by the cap-receiving fitting 20. It will be understood that the cap (not shown in FIG. 1) is normally sold with the container and snaps downwardly over the button and around the cap-receiving fitting for easy removal and replacement. Since the dispensing container in this embodiment may be entirely conventional, it is not shown or described in further detail.

In accordance with the invention there is provided a generally cylindrical vial 24 into which the dispenser 10 can be readily placed, and which typically has a flat bottom so that the dispensing container 10 will sit coaxially within it. The vial can be of any suitable thin-walled plastic material, but in accordance with the invention it is heavily weighted at its lower end by the weighting device 26 secured to the bottom thereof. Weighting device 26 may be a disc of a dense metal such as lead, cemented to or snapped into the inside of the bottom of the vial. The weight of the weighting device is less than that which would create a danger that the top of the vial, with the container within it, might sink below the level of the water.

Indicia in the form of graduations 30 are spaced from each other axially along the outer surface of the vial 24. In this case eleven such graduations are shown, defining 10 equal intervals and it will be assumed as an example that 200 doses of nitroglycerin are in the container when it is full. This means that a space between successive graduation represents a change in content by an amount equal to 20 doses.

The graduations are so located that, when the container is full, the vial will float in the water 31 contained in the ordinary glass or tumbler 33 with the uppermost graduation marked 200 at the surface of the water, and when the vial is empty the lowermost graduation marked 0 will be aligned with the top of water. If, for example, the level of the water is aligned with the graduation marked 140, there will be 140 doses left in the container.

It will be understood that the geometry and density of the container and the weighting device, as well as the positions and spacings of the graduations, will be selected in such manner that the container will be stabilized in the vertical position shown, when floating in the water, by means of the vertical floating vial in which it is contained, and so that the graduations will provide the desired accurate indications of the quantity of material remaining in the container. The effect of the weighting device 26 is to stabilize the elevation angle, i.e. the angle of tilt, of the vial, so that it remains substantially vertical while floating.

According to the method of the invention as represented in FIG. 1 then, the user need merely remove the cap from the container, place the container in the vial, and place the vial bottom downward into the liquid so that it floats vertically as shown, after which he observes that graduation which is aligned with the top level of the water and, by counting the number of graduations below that level, he can ascertain the remaining dosage. Alternatively, and preferably, numerals such as 0, 10, 20, 40 etc. are placed adjacent the corresponding graduations so that the user can directly read the number of remaining doses.

FIG. 2 shows another embodiment, in which the vial is not used. Instead, the weighting device 32 is secured direcly to the bottom of the container 34, which may be like the container 10 in FIG. 1. However, in this case the graduations 36 are placed directly on the outside wall of the container, rather than on a vial. The weighting device at the bottom may be a disc of a dense material such as lead, cemented to the bottom of the container itself. Again, the geometry, density and size of the container and the weighting device, as well as the positions and spacings of the graduations, are appropriately selected with respect to the weight of the product in the container when filled and empty so as to assure that the desired indications will be produced over the appropriate range of container contents. As is true also in the case of FIG. 1, it is not always necessary to indicate the quantity of product over the full range from full to empty, since it is more critical to display the remaining amount as the empty condition is approached; accordingly, one may, if desired, provide only indicia at the low end of the range of amount, adjacent the zero-fill condition.

FIGS. 3 and 3A illustrate still another embodiment in which a special cap 40 is provided to replace the conventional aerosol container cap. It is preferably adapted to fit and snap onto the top of the container in the conventional manner, and is provided at its upper end with a weighting device 44 in the form of a dense disc of metal, as an example; a scale 46 extends integrally therefrom along the side of the adjacent container. In FIG. 3 the assembly is shown inverted, since this is the way the assembly will float when placed into the water, due to the action of gravity on the heavy top end of the cap. It is noted that the special scale 46 need not be employed, but instead the graduations of the scale may be marked directly on the sidewall of the canister 10 as in the embodiment of FIG. 2. Alternatively, the cap can be extended downwardly and completely around the outside of the canister to form a skirt on the exterior of which the scale graduations can be formed.

The operation is directly analogous to the other embodiments shown in that the container, with the cap in place, is placed gently into the water with the cap downward so that the assembly floats vertically as shown in FIG. 3, and the position of the water level with respect to the graduations is read. Again, one can note or count the graduations remaining below the water level, or, conveniently, the graduations can be numbered to indicate directly the number of doses remaining in the container.

In all the foregoing embodiments, the weighting device may be integral with its adjacent member; that is, in FIG. 1 a thick dense material may be formed integrally at the bottom of the vial and in FIG. 2 the same technique can be used at the bottom of the container. In FIG. 3, the desired weighting can be accomplished by using a disc of material which is similar in appearance to that of the remainder of the cap but which is impregnated with dense materials; in such case, the remainder of the cap may preferably be made lightweight by forming it of a basketweave configuration of plastic strips.

The invention has been described with respect particularly to the dispensing of nitroglycerin or other similar pharmaceuticals, but it can be utilized to provide indications of the amount of flowable product remaining in a dispensing container where the container and/or the product differ markedly from those specifically shown and described.

Accordingly, while the invention has been described and shown with particular reference to specific embodiments in the interest of complete definiteness, it will be understood that it may be embodied in a variety of forms diverse from those specifically shown and described, without departing from the spirit and scope of the invention as defined by the appended claims.

What is claimed is:

1. Product-dispensing apparatus, comprising:
   product-dispensing container means for storing and dispensing flowable product, said container means being floatable in water when the amount of said product contained therein is within a predetermined range;
   flotation stabilizing means associated with said container means for stabilizing the angular position of said container means when said container means is floating in water; and
   scale means associated with said container means for indicating the position with respect to said scale means of the surface of said water on which said container means is floating, while the amount of said product therein is within said range;
   wherein said flotation stabilizing means comprises a cap fitting over a top portion of said container means and containing weighting means at its upper end such that said container means and cap will float in water in a stabilized upright position with said cap facing downwardly in said water; and
   wherein said scale means comprises a scale integral with said cap and extending along a side portion of said container means in a vertical direction when said container means is floating in said water.

* * * * *